US012311352B2

(12) United States Patent
Maier et al.

(10) Patent No.: US 12,311,352 B2
(45) Date of Patent: May 27, 2025

(54) DOOR DEVICE FOR CONNECTING A CONTAINER TO AN ISOLATION CHAMBER

(71) Applicant: castus GmbH & Co. KG, Ochsenhausen (DE)

(72) Inventors: Christoph Maier, Dettingen an der Iller (DE); Andreas Mayer, Ingoldingen (DE)

(73) Assignee: castus GmbH & Co. KG (DE)

( * ) Notice: Subject to any disclaimer, the term of this patent is extended or adjusted under 35 U.S.C. 154(b) by 808 days.

(21) Appl. No.: 17/547,886

(22) Filed: Dec. 10, 2021

(65) Prior Publication Data

US 2022/0184598 A1 Jun. 16, 2022

(30) Foreign Application Priority Data

Dec. 10, 2020 (DE) .................... 10 2020 215 620.4

(51) Int. Cl.
*B01L 1/00* (2006.01)

(52) U.S. Cl.
CPC ........... *B01L 1/00* (2013.01); *B01L 2200/141* (2013.01); *B01L 2300/043* (2013.01)

(58) Field of Classification Search
CPC ................. B01L 1/00; B01L 2200/141; B01L 2300/043; B01L 1/02; G21F 7/005
See application file for complete search history.

(56) References Cited

U.S. PATENT DOCUMENTS 4,494,586 A * 1/1985 Picard ..................... G21F 7/005 976/DIG. 356
9,683,406 B2 6/2017 Calhene
11,883,815 B2 * 1/2024 Mumm ................ B65D 45/345
2016/0201382 A1 7/2016 Dufour et al.
(Continued)

FOREIGN PATENT DOCUMENTS

CN 105518803 A 4/2016
CN 206633045 U 11/2017
EP 1 440 448 B1 7/2006
(Continued)

OTHER PUBLICATIONS

European Patent Office; Search Report in related European Patent Application No. 21 212 953.0 dated May 12, 2022; 7 pages.
(Continued)

*Primary Examiner* — James N Smalley
(74) *Attorney, Agent, or Firm* — Dorton & Willis, LLP

(57) ABSTRACT

A door device for connecting a container having a container flange with a plurality of radial flanges distributed around its circumference to an isolation chamber includes a door reversibly movable from a closed position, in which it closes a passage opening of the door device, to an open position, in which it uncovers the passage opening, and an interface of a closure, in particular a first bayonet closure for fastening a lid attached to the container. The device further includes a frame having axial grooves for receiving the radial flanges of the container and a cover reversibly movable from an insertion position in which it releases the axial grooves for
(Continued)

insertion and withdrawal of the radial flanges to a locking position in which it locks the axial grooves against withdrawal of the radial flanges to lock the container to the door device.

23 Claims, 7 Drawing Sheets

(56) References Cited

U.S. PATENT DOCUMENTS

2024/0278228 A1* 8/2024 Mottier .................. G21F 7/005

FOREIGN PATENT DOCUMENTS

| | | |
|---|---|---|
| GB | 2030503 A | 4/1980 |
| GB | 9225576 A | 6/1993 |

OTHER PUBLICATIONS

European Patent Office; Examination Report in related European Patent Application No. 21 212 953.0 dated Feb. 27, 2024; 3 pages.
Chinese Patent Office; Office Action in related Chinese Patent Application No. 202111509191.0 dated Nov. 27, 2024; 7 pages.

* cited by examiner

DOOR DEVICE FOR CONNECTING A CONTAINER TO AN ISOLATION CHAMBER

CROSS-REFERENCE TO RELATED APPLICATIONS

This application claims the benefit of priority under 35 U.S.C. § 119(a) to German Patent Application 10 2020 215 620.4, filed Dec. 10, 2020 (pending), the disclosure of which is incorporated by reference in its entirety.

TECHNICAL FIELD

The present invention relates to a door device and a method for connecting a container to an isolation chamber, and to a system comprising the door device and the container.

BACKGROUND

From EP 1 440 448 B1, a door device with a double bayonet catch composed of two bayonet catches of different chirality is known, wherein the container is locked or unlocked on a door frame by turning handles attached to a container flange.

SUMMARY

It is an object of the present invention to improve the connection of a container to an isolation chamber.

This object is solved by a door device, a system with a door device, and a method for connecting a container to an isolation chamber by a connector, as described herein.

According to one embodiment of the present invention, a door device which is arranged for or used for connecting a container to an isolation chamber, preferably in a sealing manner, particularly preferably in a sterile manner and/or in an air-tight manner and/or in a water-tight manner, comprises a frame which, in one embodiment, consists of several parts and which, in one embodiment, also delimits the isolation chamber, and a door which is reversibly adjustable, preferably pivotable, particularly preferably horizontally pivotable, from a closed position, in which it closes a passage opening of the door device or of the frame, to an open position, in which it releases said passage opening. In one embodiment, the door is mounted, preferably pivotally, on the frame.

In this way, advantageous, in particular compact, simple and/or reliable, opening and closing kinematics can be realized in one embodiment.

According to one embodiment of the present invention, a container to be connected, in particular to be temporarily or non-destructively detachably connected, has a container flange with a plurality of radial flanges, and in one embodiment, it has at least two, preferably at least three, particularly preferably at least four radial flanges, and in one embodiment, it has a maximum of six radial flanges, distributed over its circumference in one embodiment uniformly, and in one embodiment, it comprises radial outer flanges or radial flanges extending radially outwards (away) from the container flange, and a cover for closing an inlet opening and/or an outlet opening of the container, which cover can by fastened to the container, in particular in a temporarily manner or in a non-destructively detachable manner, or which is arranged for this purpose or used for this purpose. In one embodiment, the interior of the container with the lid attached forms a hermetically, sterile, sealed transport space, in particular for medical instruments, small parts or the like. In one embodiment, the inlet and/or outlet opening of the container connected to the door device and the passage opening of the door device at least partially cover each other in order to move transport material through these openings out of or into the container.

By this, in one embodiment, the container can be connected in such a way that the container contents can be moved into or out of the isolation chamber, which is separate from a storage place or an outer chamber of the container, while maintaining sterility.

According to one embodiment of the present invention, the door comprises an interface and the lid comprises a mating interface of a closure, in a preferred embodiment of a bayonet catch, which is referred to herein without limitation of generality as a first bayonet catch, by means of which the lid can be fastened to the door, in particular in a temporarily manner or in a non-destructively releasable manner, or which is arranged for this purpose or used for this purpose.

By this, in one embodiment, the lid can be transferred from the container to the door and moved through it or together with it to open or close the inlet and/or outlet opening of the container connected to the door device. In particular, by actuating the door, in one embodiment from the container's storage space or the container side, the lid can thus be handled advantageously, preferably sterilely, in one embodiment. A bayonet catch is particularly suitable for this purpose due to its reliability and kinematics.

According to one embodiment of the present invention, the frame has a plurality of, correspondingly at least two, preferably at least three, in particular at least four, and in one embodiment a maximum of six, axial grooves into which the radial flanges of the container, in one embodiment in a form fit (guided), can be (axially) inserted, in particular in a temporarily or non-destructively detachably manner, (axially) inserted, or which are arranged for this purpose or used for this purpose.

"Axial" in one embodiment refers to an insertion or longitudinal direction of the axial grooves and/or to a, preferably common, axis of rotation of the cover and/or of the actuator explained below, "circumferential" refers to a direction of rotation about an axial (longitudinal) axis, and in one embodiment axis of symmetry of the container flange, or the axis of rotation, and "radial" refers to a direction perpendicular to the axial and circumferential directions.

According to one embodiment of the present invention, the door device comprises a one-piece or multi-piece cover which is reversibly adjustable, preferably rotatable, particularly preferably rotatable about an axial axis or, respectively, the axis of rotation, from an insertion position, in which it releases the axial grooves for insertion and withdrawal of the radial flanges, into a locking position, wherein the cover in the locking position locks the axial grooves against withdrawal of the radial flanges, in one embodiment in a form fit manner and/or in a frictionally locking manner, in order to prevent the radial flanges from being removed, preferably rotatable, particularly preferably rotatable about an axial axis or the axis of rotation, wherein in the locking position the cover locks the axial grooves against the radial flanges being removed, in one embodiment in a form fit manner and/or in a frictionally locking manner, to lock the container to the door device. In one embodiment, the cover is mounted on the frame in a correspondingly adjustable, in particular rotatable, manner.

Thus, in one embodiment, the bayonet catch of the EP 1 440 448 B1 mentioned at the beginning, which requires the container to be rotated in order to be locked or unlocked, is replaced by a rotation of the cover which, analogous to one or the bayonet catch, realizes a locking or an unlocking, but in which the radial flanges are not rotated under or behind the undercuts and thereby secured against an axial withdrawal, but conversely the cover is rotated over the inserted radial flanges and thereby secures them against the axial withdrawal.

In one embodiment, this can improve the locking or the unlocking of the container on the door device, and in particular simplify the handling and/or reduce a contamination due to the movement of the container.

In one embodiment, the first bayonet catch has a plurality of radial flanges of the cover, and in one embodiment at least two, preferably at least three, particularly preferably at least four, and in one embodiment a maximum of six radial flanges, distributed over its circumference, in one embodiment uniformly, which can form a mating interface of this bayonet catch, and corresponding axial grooves and circumferentially adjacent undercuts of the door, which can form the interface of this bayonet catch, wherein in an embodiment for the locking the bayonet catch in a manner known per se, the radial flanges of the cover at first, in an embodiment together with an (axial) insertion of the radial flanges of the container into the axial grooves of the frame, are (axially) inserted into the axial grooves of the door or the interface of the first bayonet catch into the axial grooves of the frame, and then rotated circumferentially under or behind the undercuts to engage behind them and thus secure the cover to the door. By reversing this sequence, in one embodiment the lid can be released from the door again or the first bayonet catch can be unlocked.

In one embodiment, the door device, in one embodiment of the door, comprises an actuator, having one or more parts, (by means of) which the radial flanges of the mating interface of the first bayonet catch or of the cover reversibly, in one embodiment with positive engagement with the actuator, from an insertion position, in which these are arranged in the axial groove(s) of the interface, into a locking position, in which these radial flanges engage behind undercuts of the interface in order to lock the cover to the door, preferably rotated, particularly preferably about an or the axial axis about which, in one embodiment, the cover is also rotated, or which is arranged for this purpose, and which in one embodiment is (correspondingly) mounted on the door, or is used, in particular is actuated.

In one embodiment, the actuator has at least one radial flange which engages between a pair of (circumferentially) adjacent radial flanges of the cover for or during said adjustment of the radial flanges of the cover. In one embodiment, it has a plurality of radial flanges, at least one of said radial flanges of the actuator engaging between a (different) pair of (circumferentially) adjacent radial flanges of the cover.

In one embodiment, this allows the first bayonet catch to be locked or to be unlocked in a particularly advantageous manner, in particular reliably and/or precisely.

In one embodiment, the door device has a drive, in one embodiment a manually (actuable) drive and/or a mechanical drive and/or a drive arranged on the frame, in one embodiment a drive shaft, and/or a gearing mechanism, in one embodiment adjustable by the drive and/or one stage or multi-stage, wherein the cover and/or the actuator are reversibly adjusted by or by means of the drive and/or the gearing mechanism, in one embodiment positively controlled or in a constructively predetermined sequence, preferably one after the other or partly with and partly one after the other, or the drive and/or gearing mechanism are set up or are used for this purpose. In one embodiment, the gearing mechanism has one or more gearwheel (part) gears, one or more cam plate (part) gears, and/or one or more coupling (part) gears, in particular coupling rod (part) gears.

By this, in one embodiment, the cover and/or the actuator can be operated particularly advantageously, in particular reliably, simply and/or from the container side.

In one embodiment, the door device, and in one embodiment the door, has a drive, in a further development with an electric motor, which is coupled to the drive and/or to the gearing mechanism and reversibly adjusts the cover and/or the actuator via the drive and/or the gearing mechanism, in one embodiment by means of the actuator and/or the gearing mechanism adjusts the cover into a locking position and subsequently adjusts the radial flanges of the cover into a locking position and/or adjusts the radial flanges of the cover into an insertion position and subsequently adjusts the cover into an insertion position, or is arranged for or used for this purpose.

By this, in one embodiment, the operation can be facilitated.

In one embodiment, by or by means of an actuator and/or a gearing mechanism, at first, in particular without an adjustment of the radial flanges of the cover into a locking position for locking the cover to the door, the cover is adjusted into a locking position for locking the container to the door device and subsequently, in particular positively controlled and/or upon further actuation, in particular rotation, of the actuator and/or the gearing mechanism, the radial flanges of the cover are adjusted by means of the actuator into a locking position for locking the cover to the door, in an embodiment alone without a further displacement of the cover or at least partially with further displacement of the cover, which in the process continues to block the axial grooves against the radial flanges being withdrawn, and/or, in particular with or with reversal of the actuation (direction) of the drive and/or the gearing mechanism, first of all the radial flanges of the cover are moved by means of the actuator into an insertion position and/or the axial grooves of the interface of the first bayonet catch and subsequently, in particular positively controlled and/or upon further actuation (in the opposite direction to the locking), in particular rotation, of the drive and/or the gearing mechanism, the cover is adjusted into an insertion position, preferably without a displacement of the radial flanges of the cover, or the drive and/or the gearing mechanism are arranged for this purpose or are used for this purpose.

Thus, in one embodiment, this can improve the handling by first attaching the container to the door device and then (with the container still attached to the door device) attaching the lid to the door or, conversely, first unlocking the lid from the door and only then unlocking the container from the door device by continuing to actuate in a fixed or by the design predetermined manner.

In one embodiment, the door device comprises a latch, and in one embodiment operable by the drive and/or the gearing mechanism, which reversibly, in one embodiment form fit manner and/or in a frictionally locking manner locks the door in its closed position, or is arranged for this purpose or used for this purpose.

In one embodiment, this latch has a pin on the door side and a rotary body rotatably mounted on the frame side and having an axial groove and a circumferential groove connected thereto, the pin being able to be withdrawn out of the circumferential groove of the rotary body, in which it locks the door, by rotating the rotary body into the axial groove of the rotary body and out of the latter while opening, in particular pivoting open, the door unlocked by the transfer from the circumferential groove into the axial groove of the rotary body, or, conversely, when the door is closed, first entering the axial groove of the rotating body and continuing to move out of this by rotating the rotating body into the circumferential groove of the rotating body, thereby locking the door. In one embodiment, such a latch is particularly simple and/or reliable to actuate by means of a drive or a gearing mechanism.

In a preferred embodiment, at first the lock which fastens the cover to the door or which is arranged for this purpose or which is used for this purpose, i.e. in particular the first bayonet catch, is locked and then, in particular positively controlled and/or by the drive and/or the gear mechanism, in one embodiment by further actuating, in particular rotating, the drive and/or the gear mechanism, this latch or the door is unlocked and/or, in particular with or with reversal of the actuation (direction) of the drive and/or the gear mechanism, conversely first of all this latch or the door is locked in its closed position and subsequently, in particular positively controlled and/or by the drive and/or the gearing mechanism, in an embodiment by further actuation, in particular rotation, of the drive and/or the gearing mechanism, the lock which fastens the cover to the door or is set up or used for this purpose, in particular the first bayonet lock, is unlocked or the lock is arranged for this purpose or used for this purpose.

In one embodiment, this can (further) improve the handling and/or reduce the likelihood of unintentional opening of the door and thus a potential contamination of the isolation chamber.

In one embodiment, the door is swung open, in particular after unlocking and/or force-controlled and/or by the drive and/or the gearing mechanism, and in one embodiment by further actuation, in particular rotation, of the drive and/or the gearing mechanism, or, if appropriate with a reversal of the actuation (direction) of the drive and/or the gearing mechanism, the door is first swung into its closed position and subsequently locked if appropriate, or the door device, in particular the drive and/or the gearing mechanism, is arranged for this purpose or is used for this purpose.

In one embodiment, this can (further) improve the handling and/or allow the door to be pivoted from the container's storage space.

In one embodiment, the gearing mechanism comprises a (first) freewheel which adjusts the cover when or while the drive is adjusted in a first range of adjustment, and does not adjust the cover, but in one embodiment instead locks it when or while the drive is adjusted in a second range of adjustment and/or when or while the drive is adjusted in a third range of adjustment, or which is arranged for or used for this purpose.

Additionally or alternatively, in one embodiment, the gearing mechanism comprises a (second) freewheel which adjusts the actuator when or while the drive is adjusted in an adjustment range which in one embodiment is the second adjustment range, and which does not adjust the actuator, and blocks it instead in one embodiment when or in one embodiment, does not move when or while the actuator is moved in another range of movement, in one embodiment, and blocks it instead when or while the actuator is moved in the first range of movement and/or when or while the actuator is moved in the third range of movement, or which is arranged for this purpose or used for this purpose.

Additionally or alternatively, in one embodiment, the gearing mechanism comprises a (third) freewheel which adjusts the latch for locking the door when or while the drive is adjusted in an adjustment range which in one embodiment is the third adjustment range, and which does not adjust the latch, and blocks it instead in one embodiment when or in one embodiment, does not move the latch, and blocks it instead when or while the actuator is moved in another range of movement, in one embodiment, and blocks it instead when or while the actuator is moved in the first range of movement and/or when or while the actuator is moved in the second range of movement, or which is arranged for this purpose or used for this purpose.

Thus, in particular, the following preferred embodiment can be implemented:

In a first adjustment range of the drive, the gearing mechanism only adjusts the cover (first freewheel locks), while it does not adjust, preferably locks (second freewheel and third freewheel open, if applicable), the actuator and, if applicable, the latch for locking the door. Then, in a second range of adjustment, the gearing mechanism adjusts only the actuator (second freewheel locked), while it does not adjust, preferably locks (first freewheel and third freewheel open, if any), the cover and the latch, if any. In one embodiment, in a third range of adjustment, the gearing mechanism only adjusts the latch (third freewheel locks), while it does not adjust the cover and the actuator, preferably locks (first and second freewheel open).

Similarly, the following advantageous embodiment can be implemented in particular:

In a first range of the adjustment of the drive, the gearing mechanism only adjusts the cover (first freewheel locks), while it does not adjust, preferably blocks the actuator and, if applicable, the latch for locking the door (second freewheel and third freewheel open). In a second range of the adjustment, the gearing mechanism then adjusts both the cover, which thereby continues to block the axial grooves of the frame against the withdrawal of the radial flanges of the container, and the actuator (first and second freewheels locks), while it does not adjust, preferably blocks (third freewheel open), the latch, if any. In one embodiment, in a third range of the adjustment, the gearing mechanism only adjusts the latch (third freewheel locks), while it does not adjust, preferably locks (first and second freewheels open), the cover and the actuator.

In this way, in one embodiment, in each case the positively guided sequence explained elsewhere can be realized in a particularly advantageous manner: locking the container to the door device by means of a cover→locking the lid to the door by means of a (first bayonet) catch and, if appropriate,→unlocking the latch or the door →opening the door or, conversely, closing the door→if appropriate locking the latch or the door→unlocking the lid from the door→unlocking the container.

In general, a positive control, in particular one fixed by design, as referred to herein is understood to mean a given or determined sequence or (corresponding) positive control, in one embodiment by means of one or more freewheels. In one embodiment, a freewheel or such a positive control or guidance comprises one or more link guides, one or more gearings with non-engaging sections or the like. In one embodiment, the gearing mechanism comprises one or more cam (part) gears, in particular one or more freewheels can be implemented by means of a cam principle.

Additionally or alternatively, in one embodiment the gearing mechanism comprises a clutch that is closed when the door is in the closed position and open when the door is in the open position, and which in one embodiment is closed by closing the door or opened by opening the door.

In one embodiment, this allows a door-side gear section to pivot along with the door.

In one embodiment, the cover has a ring with a plurality of grooves through which, in the insertion position of the cover, the radial flanges of the container can be inserted or are inserted into the axial grooves of the frame, or which are arranged for this purpose or used for this purpose.

In one embodiment, this can improve the insertion of the radial flanges of the container and/or the locking of the axial grooves and/or the adjustment of the cover.

In one embodiment, a bayonet catch is provided, by means of which the lid is reversibly or non-destructively detachably or temporarily fastened to the container, or it is arranged for this purpose or used for this purpose, this bayonet catch being referred to herein without restriction of generality as a second bayonet catch and, in one embodiment, being unlocked by closing the first bayonet catch, and in one embodiment adjusting the radial flanges of the lid into their locking position, and in one embodiment simultaneously, or which is arranged for this purpose or used for this purpose.

Thus, in one embodiment, the handling can be further improved.

According to one embodiment of the present invention, in order to connect a container described herein to an isolation chamber by means of a door device described herein, the radial flanges of the container are inserted axially into the axial grooves of the frame and locked there by adjusting the cover into a locking position, and in one embodiment by means of actuating the drive, in particular in its first adjustment range, and/or by means of the gearing mechanism (actuated in one embodiment by the drive).

In one embodiment, the actuator for adjusting the radial flanges of the lid is subsequently moved, preferably positively controlled, into a locking position in order to secure the lid to the door and, in a preferred embodiment, also to unlock the second bayonet catch in the process, i.e. to transfer the lid from the container to the door. In one embodiment, the actuator is (correspondingly) adjusted by means of actuating of the actuator, in particular in its second adjustment range, and/or by means of the gearing mechanism (actuated in one embodiment by the actuator).

In one embodiment, following this adjustment of the actuator, the latch or the door is unlocked, preferably positively controlled, and in one embodiment by actuating the drive, in particular its third adjustment range, and/or by means of the gearing mechanism (actuated in one embodiment by the drive).

In one embodiment, the door with the cover attached thereto is adjusted, in particular pivoted, and in one embodiment by actuation from the container side or a storage area of the container and/or into the isolation chamber. Subsequently, the transport material can be withdrawn from and/or inserted into the container (inner space) or its transport space.

To remove the container connected to the isolation chamber or the door device, the corresponding steps are carried out in an embodiment in a reverse order and/or an opposite displacement of the door, if applicable of the latch, if applicable of the actuator, of the cover and/or if applicable of the drive and/or the gearing mechanism.

In one embodiment, the door device delimits the isolation chamber, and in one embodiment it is fixed to a wall of the isolation chamber, or its passage opening forms an access to the isolation chamber, or the door device is arranged for this purpose or used for this purpose.

Where reference is made herein to a second or third element, for example the second bayonet catch or the third adjustment range, this does not necessarily imply the presence of a (corresponding) first or second element, for example the first bayonet catch or the second adjustment range.

In one embodiment, the actuation is a manual actuation, in particular (by) manually applying an actuation force or a torque.

In one embodiment, this can improve the handling, particularly a variable and/or a sterile handling.

In one embodiment, the actuation is an actuation by a drive or a motorized actuation, in particular an electromotive actuation.

This can facilitate the handling in one embodiment.

In one embodiment, the drive is arranged on a side of the door device facing away from or opposite to the isolation chamber or on a container side or in an storage space of the container.

In one embodiment, this can improve the handling, particularly the sterile handling.

Further advantages and features will be apparent from the exemplary embodiments described herein.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 4 schematically depicts the system with the actuator adjusted; an

DETAILED DESCRIPTION

Figure 1:
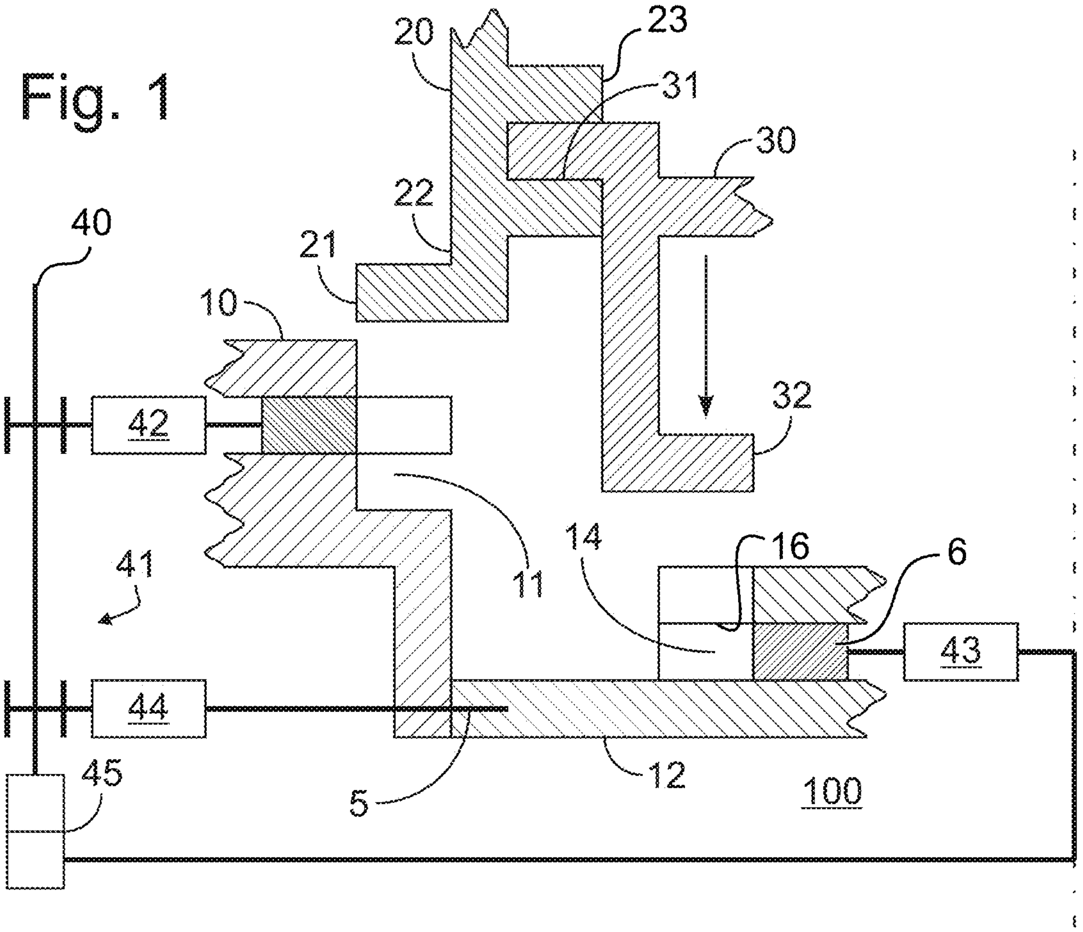
FIG. 1 schematically illustrates a system comprising a door device when connecting a container according to one embodiment of the present invention.
Figure 1:
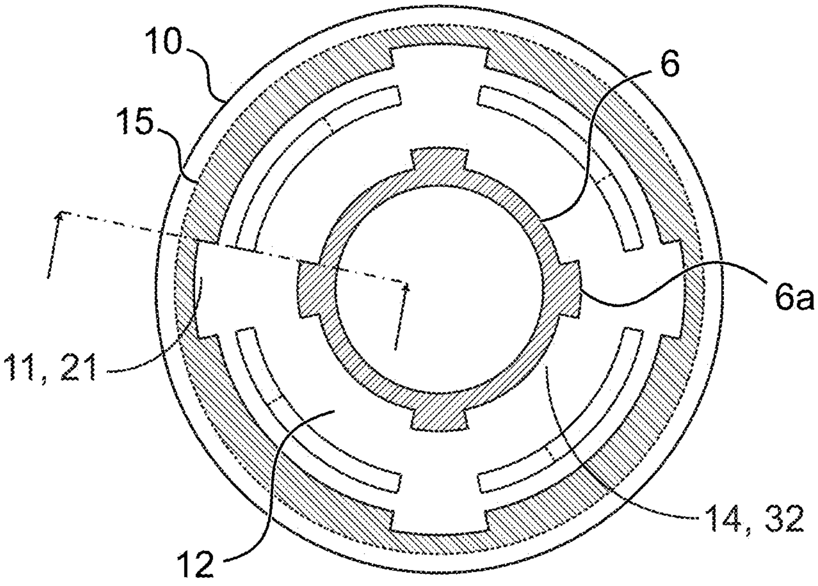

FIGS. 1 to 5 show, in a functional illustration, a system comprising a door device during a method of connecting a container 20 to an isolation chamber 100 according to one embodiment of the present invention, each in a top half-section along an axial direction (vertical in the top half-section) and in a bottom plan view.

In a first step (see FIG. 1), radial flanges 21 of a container flange 22 of the container 20 are inserted into axial grooves 11 of a frame 10 of the door device.

Figure 5:
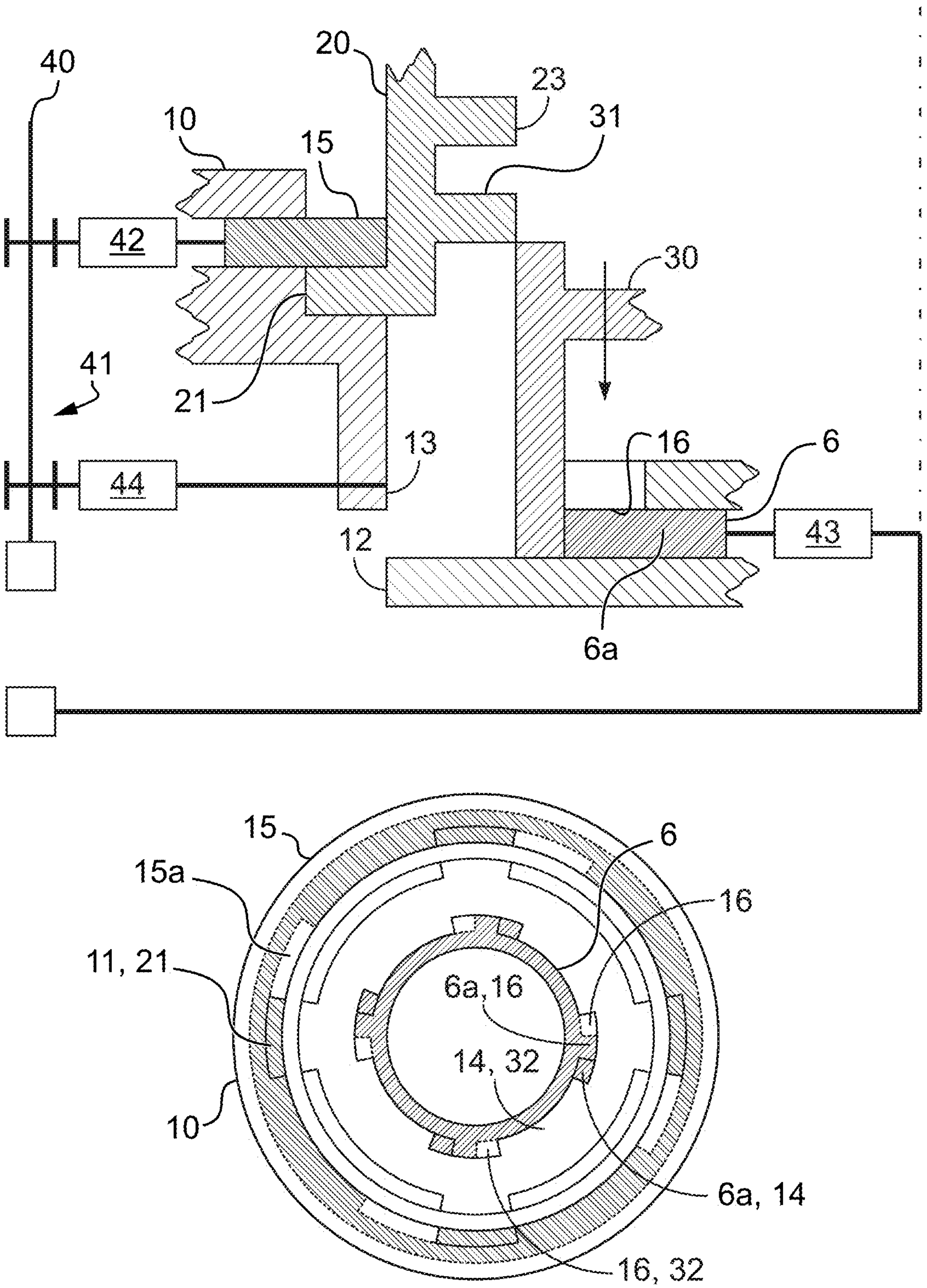
FIG. 5 schematically depicts the system with the door open.

In this case, a door 12 of the door device is locked by a latch 5 in a closed position in which it closes a passage opening 13 of the door device or of the frame (cf. FIG. 5).

A lid 30 is reversibly secured to the container 20 by a second bayonet catch 31, and closes an inlet and outlet opening 23 (cf. FIG. 5) of the container. It has a mating interface of a first bayonet catch in the form of a plurality of radial flanges 32.

These radial flanges 32 are axially inserted into axial grooves 14 of a door-side interface of the first bayonet catch when the radial flanges 21 of the container 20 are axially inserted into the frame-side axial grooves 11.

Figure 2:
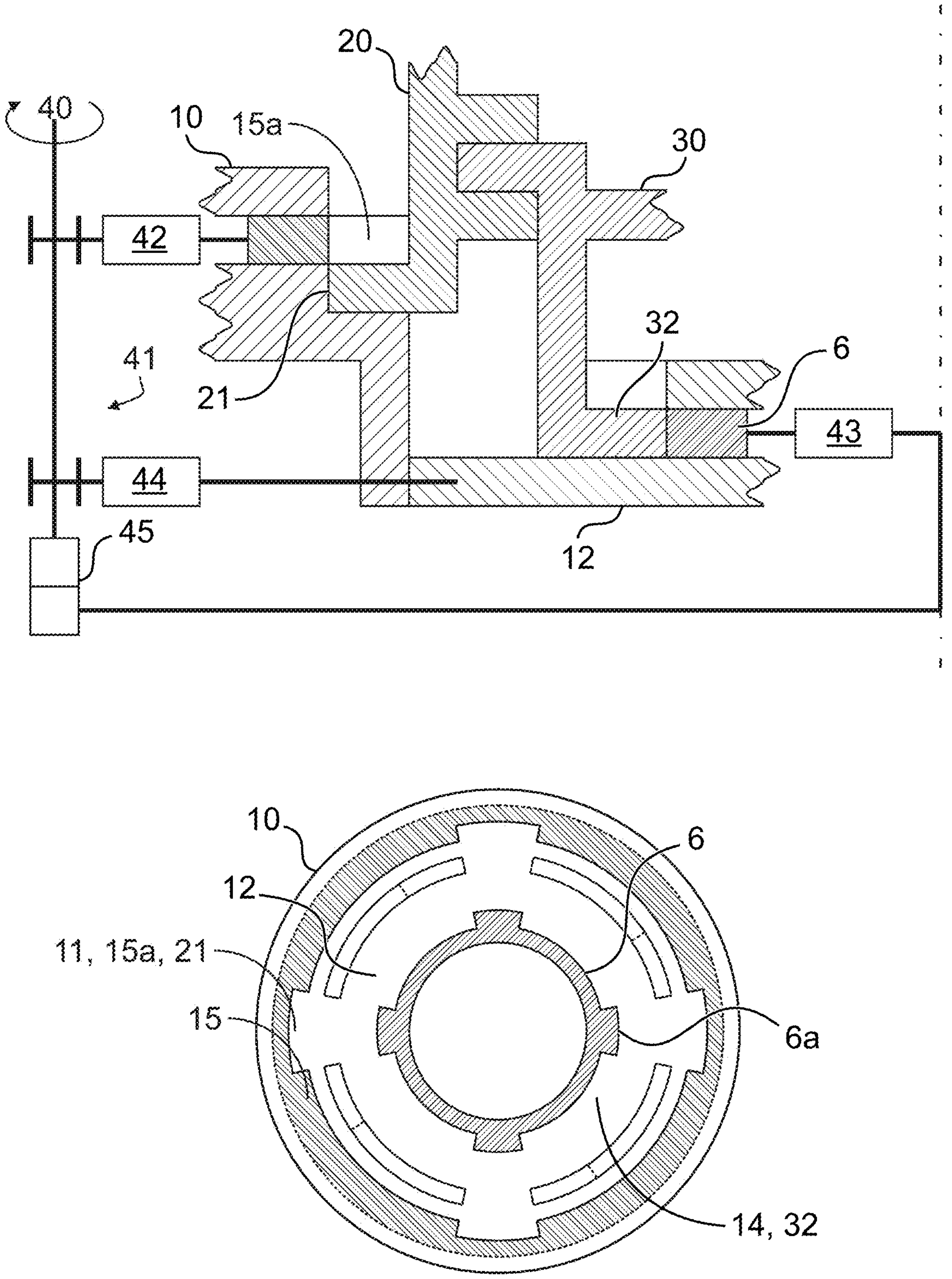
FIG. 2 schematically depicts the system with radial flanges of the container inserted axially.

FIG. 2 shows the position after the insertion of the radial flanges 21, 32 into the axial grooves 11, 14.

Figure 3:
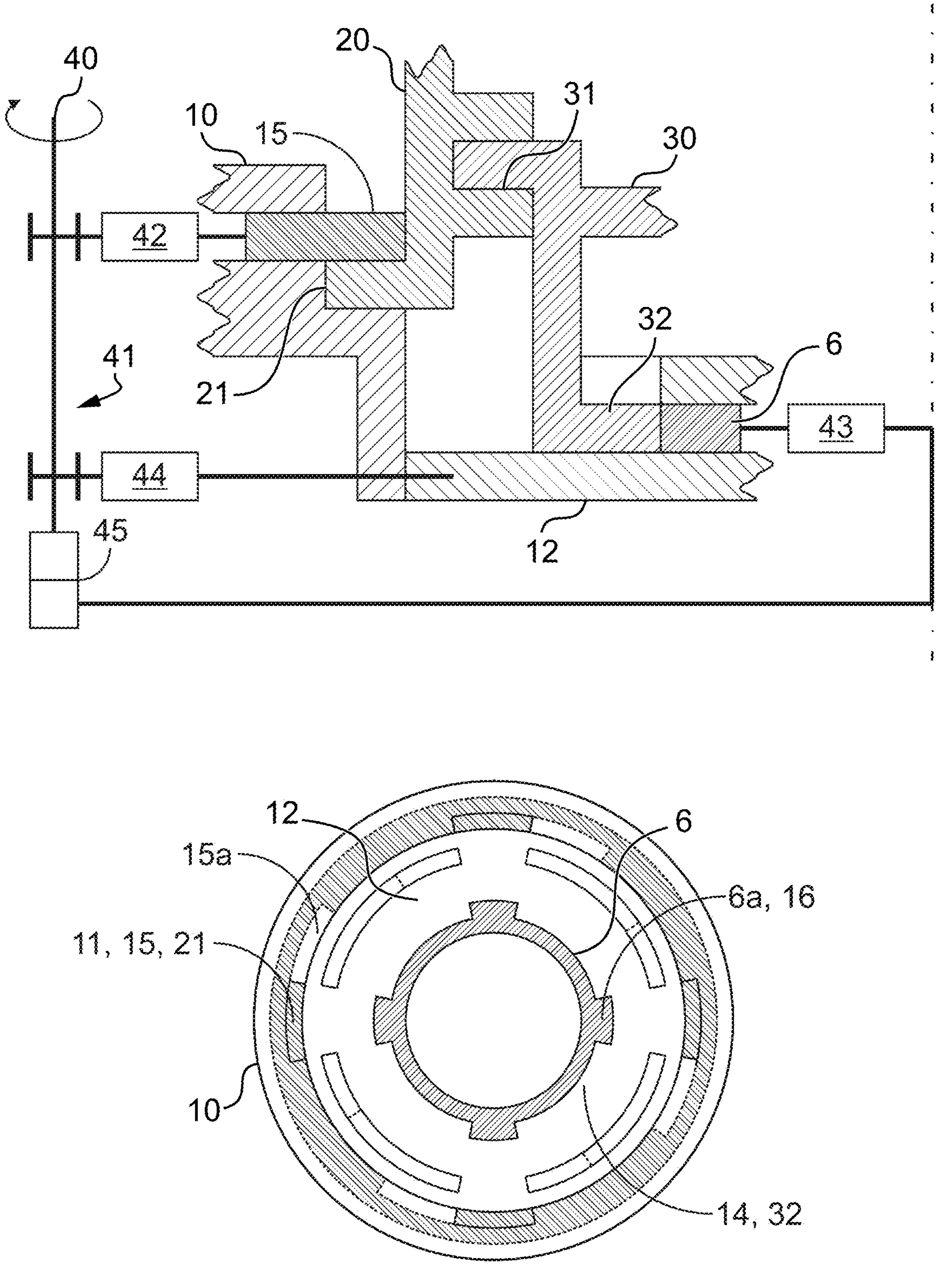
FIG. 3 schematically depicts the system with the cover of the door device adjusted.

Starting from this insertion position, by rotating an actuator 40 which actuates or adjusts a gearing mechanism 41, a cover 15 is first moved from the insertion position, in which it clears the axial grooves 11 for the insertion and the withdrawal of the radial flanges 21, by grooves 15*a* of the annular cover 15 overlapping or releasing these axial grooves 11 of the frame 10, to a locking position shown in FIG. 3, in which it blocks the axial grooves 11 against the withdrawal of the radial flanges 21 in order to attach the container 20 to the door into a locking position shown in FIG. 3, in which it locks the axial grooves 11 against the radial flanges 21 being withdrawn in order to lock the container 20 to the door device (cf. FIG. 2→FIG. 3). The drive 40 may be rotated from a storage area of the container 20 or a side of the container (top of FIG. 2), in one embodiment manually, in another embodiment by a drive (not shown) but which may be coupled elsewhere to the gearing mechanism 41.

Subsequent to this first range of the adjustment of the drive 40, a first freewheel 42 (previously blocking) blocks the cover in the event of further rotation of the drive 40 in the same direction, instead of further adjusting it in the process, or this first freewheel 42 opens.

A door side actuator 6 has four radial flanges 6*a*, each of which engages between a different pair of adjacent radial flanges 32 of the cover.

Figure 4:
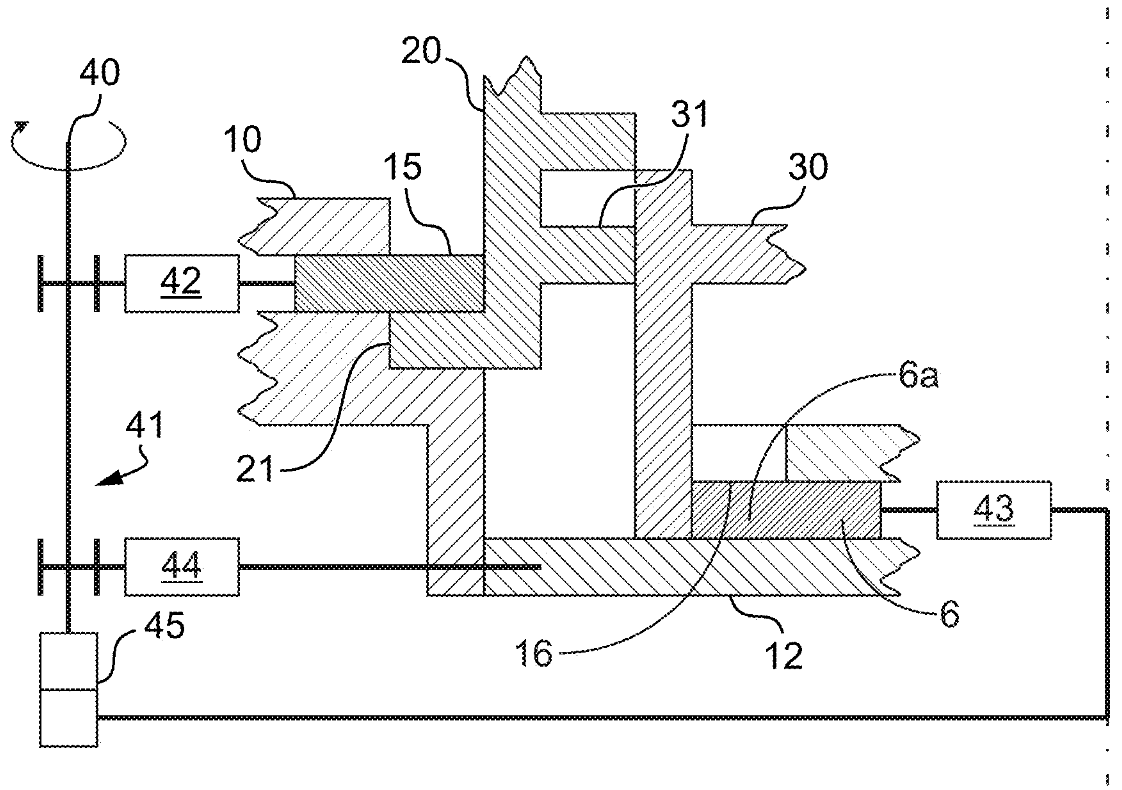
Figure 4:
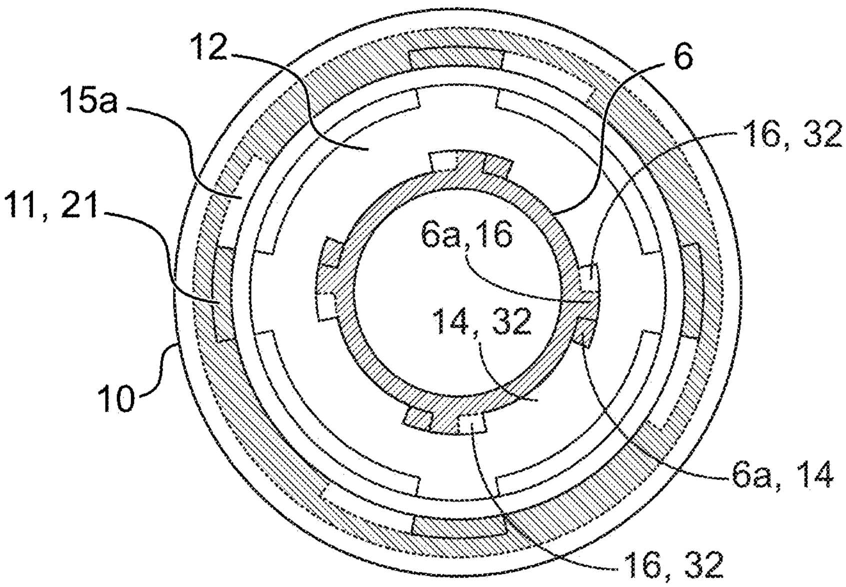

During this further rotation of the drive 40, a (previously open) second freewheel 43 locks, so that the drive 40 or the gearing mechanism 41 now rotate this previously locked actuator 6 (cf. FIG. 3→FIG. 4).

As a result, the actuator 6 or its radial flanges 6*a* move these radial flanges 32 of the cover from an insertion position (FIGS. 1 to 3), in which they are arranged in the axial grooves 14 of the interface of the first bayonet catch, to a locking position (FIGS. 4, 5), in which these radial flanges 32 engage behind undercuts 16 of the door-side interface to lock the cover 30 to the door 12.

This turning of the cover 30 with its radial flanges 32 also simultaneously unlocks the second bayonet catch 31.

Subsequent to this second range of the adjustment of the actuator 40, the second freewheel 43 blocks the actuator in case of further rotation of the actuator 40 in the same direction, instead of adjusting it further, or the second freewheel 43 opens.

Now a (previously open) third freewheel 44 locks, so that now the drive 40 or the gearing mechanism 41 unlock the latch 5 and the door 12 with the cover 30 attached to it can be opened, whereby a clutch 45 of the gearing mechanism opens (cf. FIG. 4→FIG. 5).

This swinging open of the door 12 may, in one embodiment, be caused or occur by a further rotation of the drive 40 in the same direction and/or by means of the gearing mechanism 41.

By reversing the above-mentioned sequence by turning the drive 40 in opposite directions, after closing (if necessary by means of the drive 40 and/or the gearing mechanism 41) the door is locked by the latch 5 (cf. FIG. 5→FIG. 4), then the lid is unlocked from the door by unlocking the first bayonet catch, i.e. by turning out the radial flanges 32 under the undercuts 16 and simultaneously locked to the container by locking the second bayonet catch 31 (cf. FIG. 4→FIG. 3), and then the axial grooves 11 are released by turning the cover 15 (cf. FIG. 3→FIG. 2), so that the container 20 with the lid 30 attached to it can be removed (cf. FIG. 2→FIG. 1).

Figure 6:
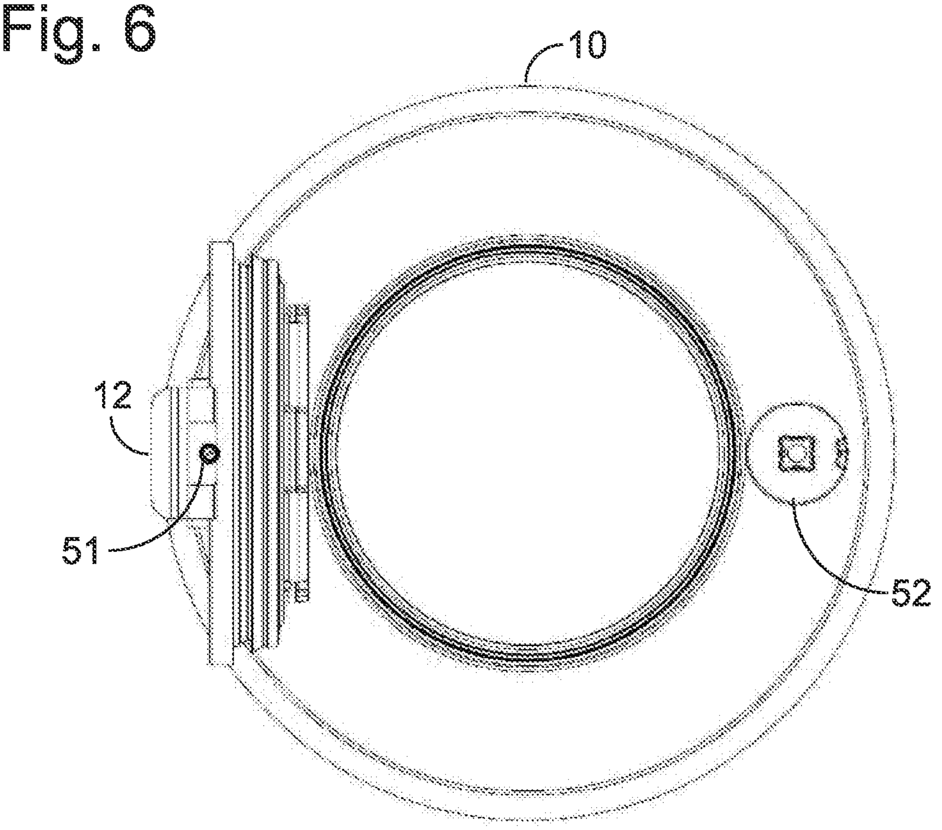
FIG. 6 is a top view of the door device with the door open as seen from the isolation chamber.

FIG. 6 illustrates, in particular, a door-side pin 51 and a frame-side rotatable pivot 52 of the latch, wherein the pin 51 can be restrained or released by rotating the pivot 52.

Figure 7:
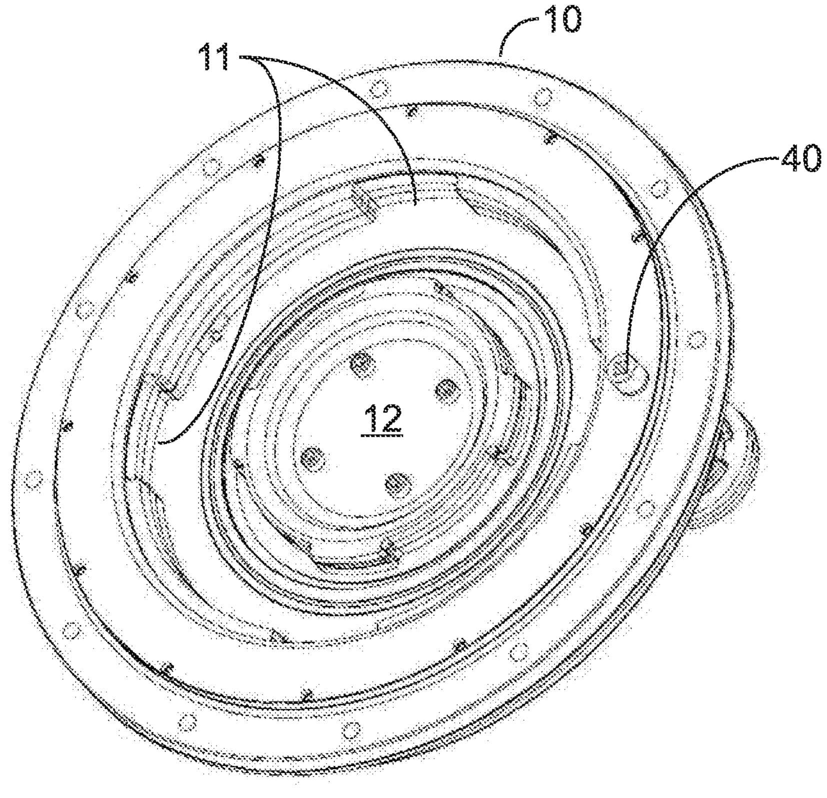
FIG. 7 is a perspective view of the door device when the door is closed, as seen from the container's storage space.
Figure 8:
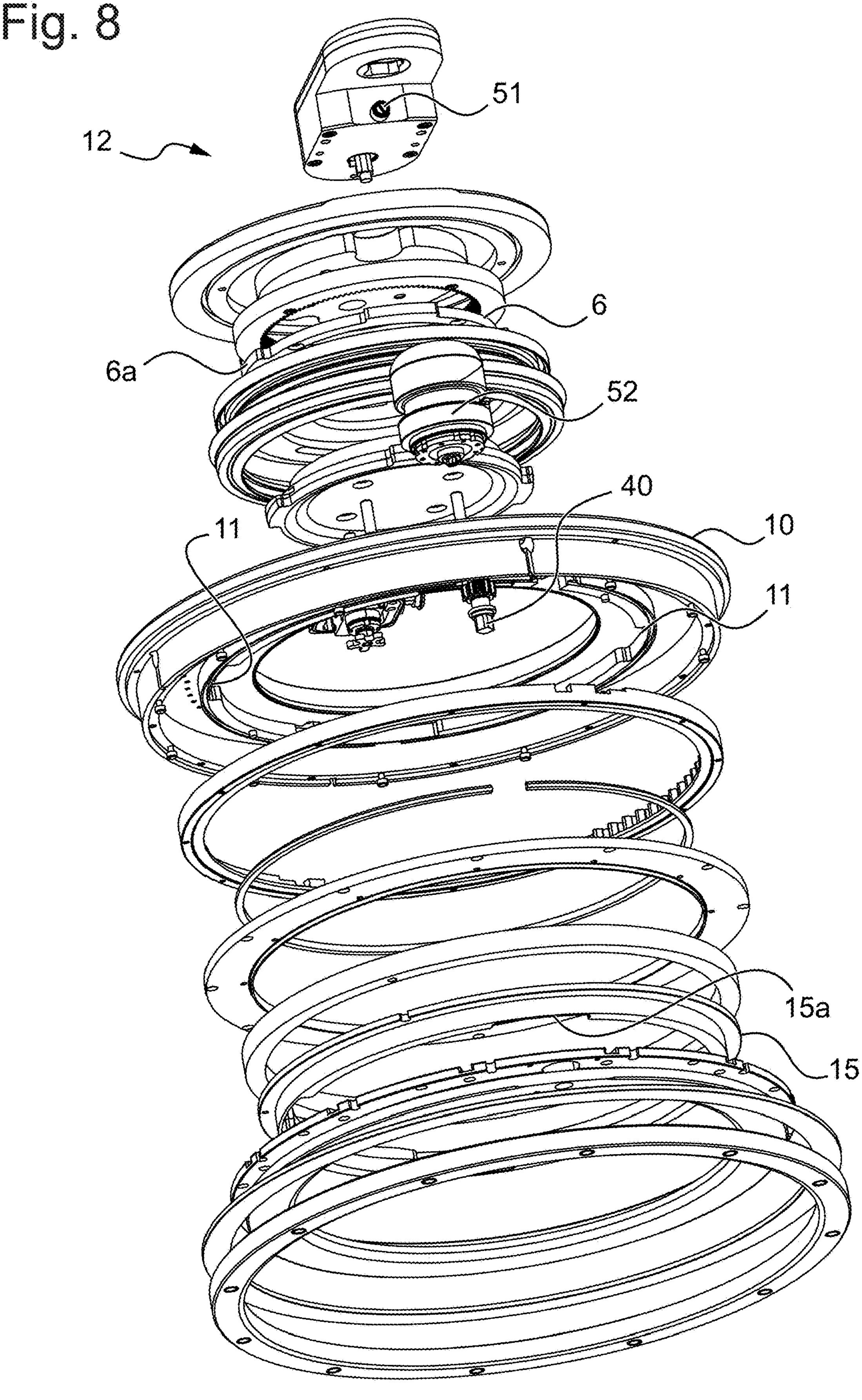
FIG. 8 is an exploded view of components of the door device.

In particular, FIGS. 7, 8 illustrate a drive 40 that can be actuated from a storage area of the container or a container side (top of the FIG. 1).

Although the embodiments have been explained in the foregoing description, it should be noted that a variety of variations are possible.

For example, the cover 15 can be rotated even further in the second adjustment range, i.e. when the actuator 6 is adjusted to lock the first bayonet catch, while continuing to block the axial grooves 11 against the radial flanges 21 being removed, and can only be blocked, possibly together with the second freewheel 43 or even before or after the latter, by the first freewheel 42 before the third freewheel 44 adjusts the latch 5 or the drive 40 is adjusted for this purpose in the third adjustment range.

Moreover, the FIGS. 1 to 5 should be understood as functional illustrations. For example, as can be seen in the FIG. 6, the latch 5 can also be implemented in that a door fixed pin 51 engages in a circumferential groove of a rotary body 52 mounted on the frame side in order to latch the door, wherein this rotary body 52 can be rotated by means of a drive or a gearing mechanism in such a way that the pin moves out of the circumferential groove into an axial groove, from which it can extend while swinging the door open.

Furthermore, it should be noted that the embodiments are merely examples which are not intended to limit the scope of protection, the uses and the structure in any way. Rather, the foregoing description provides the skilled person with a guide for implementing at least one embodiment, whereby various modifications may be made, in particular with respect to the function and arrangement of the components described, without departing from the scope of protection as it results from the claims and its equivalents.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

5 latch
6 actuator
6*a* radial flange of the actuator
10 frame
11 axial groove of the frame
12 door
13 passage opening
14 axial groove of the door

15 cover
15*a* cover groove
16 undercut
20 container
21 radial flange of the container
22 container flange
23 inlet and outlet opening
30 lid
31 second bayonet catch
32 radial flange of the cover
40 drive
41 gearing mechanism
42-44 freewheel
45 coupling
51 pin
52 rotary member
100 isolation chamber

What is claimed is:

1. A door device for connecting a container to an isolation chamber, the container having a container flange with a plurality of radial flanges distributed around its periphery, the door device comprising:
- a door reversibly movable to and from a closed position, in which the door closes a passage opening of the door device, and an open position, in which the door uncovers the passage opening;
- the door including an interface of a closure for securing a lid fixed to the container;
- a frame with axial grooves for receiving the radial flanges of the container; and
- a cover reversibly movable from an insertion position, in which the cover releases the axial grooves for insertion and withdrawal of the radial flanges of the container, to a locking position, in which the cover locks the axial grooves against withdrawal of the radial flanges to thereby lock the container to the door device.

2. The door device of claim 1, wherein the closure is a first bayonet catch.

3. The door device of claim 1, further comprising an actuating member designed to reversibly move a plurality of radial flanges of the lid from an insertion position, in which the radial flanges of the lid are disposed in axial grooves of the interface of the closure, to a locking position, in which the radial flanges of the lid engage behind undercuts of the interface to thereby lock the lid to the door.

4. The door device of claim 3, wherein the actuating member comprises at least one radial flange that engages between a pair of adjacent radial flanges of the lid to thereby adjust the radial flanges of the lid.

5. The door device of claim 3, further comprising:
- at least one of a drive or a gearing mechanism;
- the at least one of the drive or the gearing mechanism designed for reversibly adjusting at least one of the cover or the actuating member.

6. The door device of claim 5, wherein at least one of:
- the drive is at least one of a manual drive or a drive arranged on the frame;
- the at least one of the drive or the gearing mechanism is designed for reversibly adjusting the cover into a locking position, and subsequently adjusting the radial flanges of the lid into a locking position using the actuating member; or
- the at least one of the drive or the gearing mechanism is designed for reversibly adjusting the radial flanges of the lid into an insertion position using the actuating member, and subsequently adjusting the cover into an insertion position.

7. The door device of claim 5, wherein at least one of:
- the door device further comprises a latch that is actuatable to reversibly lock the door in the closed position; or
- the door is at least one of:
  - pivotable under positive control,
  - pivotable by the drive, or
  - pivotable by the gearing mechanism.

8. The door device of claim 7, wherein at least one of:
- the latch is actuatable by at least one of the drive or the gearing mechanism; or
- the door is pivotable into at least one of:
  - the closed position from the open position before locking, or
  - the open position from the closed position after unlocking.

9. The door device of claim 7, wherein the gearing mechanism comprises at least one of:
- a freewheel designed to adjust the cover in a first adjustment range of the drive and not adjust the cover in at least one of a second or third adjustment range of the drive;
- a freewheel designed to adjust the actuating member in one adjustment range of the drive and not adjust the actuating member in a different adjustment range of the drive;
- a freewheel designed to adjust the latch for reversibly locking the door in one adjustment range of the drive and not adjust the latch in a different adjustment range of the drive; or
- a coupling that is closed in the closed position of the door and open in the open position of the door.

10. The door device of claim 9, wherein at least one of:
- the freewheel is designed to block the cover in at least one of the second or third adjustment ranges of the drive;
- the freewheel is designed to adjust the actuating member in the second adjustment range of the drive;
- the freewheel is designed to block the actuating member in the different adjustment range of the drive;
- the different adjustment range of the drive for which the actuating member is not adjusted is at least one of the first or third adjustment ranges of the drive;
- the freewheel is designed to adjust the latch in the third adjustment range of the drive;
- the freewheel is designed to block the latch in the different adjustment range of the drive; or
- the different adjustment range of the drive for which the latch is not adjusted is at least one of the first or second adjustment ranges of the drive.

11. The door device of claim 1, wherein the cover comprises a ring with a plurality of grooves through which, in the insertion position of the cover, the radial flanges of the container can be inserted into the axial grooves of the frame.

12. A system, comprising:
- a container for connection to an isolation chamber, the container having a container flange with a plurality of radial flanges distributed around its periphery;
- a lid coupled with the container; and
- a door device according to claim 1;
- the container and the lid having a mating interface of the closure for attachment to the door of the door device.

13. The system of claim 12, wherein:
- the closure of the door device is a first bayonet catch; and
- the mating interface of the container and lid attach to radial flanges of the first bayonet catch.

14. The system of claim 13, further comprising a second bayonet catch for reversibly securing the lid to the container.

15. The system of claim 14, wherein the second bayonet catch is unlockable by closing the first bayonet catch.

16. A method for connecting a container to an isolation chamber with a door device according to claim 1, the container having a container flange with a plurality of radial flanges distributed around its periphery, the method comprising:

axially inserting the radial flanges of the container into the axial grooves of the frame; and locking the radial flanges of the container in the axial grooves by moving the cover into a locking position.

17. The method of claim 16, wherein:

the door device further comprises:

an actuating member designed to reversibly move a plurality of radial flanges of the cover from an insertion position, in which the radial flanges are disposed in axial grooves of the interface of the first bayonet catch, to a locking position, in which the radial flanges engage behind undercuts of the interface to thereby lock the cover to the door, and at least one of a drive or a gearing mechanism, the drive or gearing mechanism designed for reversibly adjusting at least one of the cover or the actuating member; and moving the cover into the locking position comprises at least one of:

moving the cover by actuation of the drive, or moving the cover with the gearing mechanism.

18. The method of claim 17, further comprising moving the actuating member for adjusting the radial flanges of the lid into a locking position.

19. The method of claim 18, wherein at least one of:

the actuating member is moved by actuating the drive; or the actuating member is moved with the gearing mechanism.

20. The method of claim 18, further comprising unlocking the door.

21. The method of claim 20, wherein at least one of:

the door is unlocked by actuating the drive; or the door is unlocked with the gearing mechanism.

22. The method of claim 20, further comprising swinging the door to an open position.

23. The method of claim 22, wherein at least one of:

the door is swung to the open position by actuating the drive; or the door is swung to the open position with the gearing mechanism.

* * * * *